(12) United States Patent
Gapinski

(10) Patent No.: US 11,963,561 B2
(45) Date of Patent: Apr. 23, 2024

(54) WATERPROOF GLOVE WITH BREATHABLE SECTIONS AND METHOD FOR MAKING SAME

(71) Applicant: DashAmerica, Inc., Louisville, CO (US)

(72) Inventor: Albert Gapinski, Louisville, CO (US)

(73) Assignee: DASHAMERICA, INC., Louisville, CO (US)

(*) Notice: Subject to any disclaimer, the term of this patent is extended or adjusted under 35 U.S.C. 154(b) by 1109 days.

(21) Appl. No.: 16/788,018

(22) Filed: Feb. 11, 2020

(65) Prior Publication Data

US 2020/0253305 A1   Aug. 13, 2020

Related U.S. Application Data

(60) Provisional application No. 62/804,417, filed on Feb. 12, 2019.

(51) Int. Cl.
| A41D 19/00 | (2006.01) |
| A41D 19/015 | (2006.01) |
| A41D 19/04 | (2006.01) |
| B29C 33/56 | (2006.01) |
| B29L 31/48 | (2006.01) |

(52) U.S. Cl.
CPC ....... *A41D 19/0006* (2013.01); *A41D 19/015* (2013.01); *A41D 19/04* (2013.01); *B29C 33/56* (2013.01); *B29L 2031/4864* (2013.01); *B32B 2307/7265* (2013.01)

(58) Field of Classification Search
CPC .............................................. B29L 2031/4864
See application file for complete search history.

(56) References Cited

U.S. PATENT DOCUMENTS

| 10,661,543 B2 | 5/2020 | Morlacchi | |
| 2011/0179549 A1* | 7/2011 | Zaggl | B32B 9/048 |
| | | | 2/163 |
| 2013/0219588 A1* | 8/2013 | Nakagawa | A41D 19/01558 |
| | | | 2/167 |

* cited by examiner

*Primary Examiner* — Ian A Rummel
(74) *Attorney, Agent, or Firm* — FAEGRE DRINKER BIDDLE & REATH LLP

(57) ABSTRACT

A method of manufacturing a glove assembly that includes obtaining an outer shell having an outer surface and an inner surface and turning the outer shell inside out, coating the inner surface of the outer shell with a waterproof coating, obtaining an inner liner, and securing the inner liner to the inner surface of the outer shell. The outer shell is made of a material that is waterproof and breathable.

4 Claims, 4 Drawing Sheets

WATERPROOF GLOVE WITH BREATHABLE SECTIONS AND METHOD FOR MAKING SAME

CROSS REFERENCE TO RELATED APPLICATIONS

This application claims the benefit of U.S. Provisional Application No. 62/804,417, filed Feb. 12, 2019, the entirety of which is incorporated herein by reference.

FIELD OF THE INVENTION

The invention relates to gloves for bicycling, and more particularly to a waterproof glove that includes breathable sections.

BACKGROUND OF THE INVENTION

There is a need for gloves to keep hands warm in many conditions while cycling or participating in other outdoor sports activities during the winter. During activity, glove users experience many environmental external factors such as low temperatures, high wind and potentially wet weather. The user may also generate heat that causes their hands to sweat and create undesirable moisture that can lead to heat loss.

SUMMARY OF THE PREFERRED EMBODIMENTS

In accordance with a first aspect of the present invention there is provided a method of manufacturing a glove assembly that includes obtaining an outer shell having an outer surface and an inner surface and turning the outer shell inside out, coating the inner surface of the outer shell with a waterproof coating, obtaining an inner liner, and securing the inner liner to the inner surface of the outer shell. The outer shell is made of a material that is waterproof and breathable. In a preferred embodiment, the method includes masking a masked portion of the inner surface of the outer shell with a mask prior to the coating step. An inner surface of the masked portion is not coated as a result of the mask. The mask is then removed.

In a preferred embodiment, the coating includes aggregate therein, such that the coating has a gritty texture. Preferably, during the coating step, the outer shell is dipped into a vessel with a liquid waterproof coating therein. In a preferred embodiment, the method includes obtaining a base member having an outer surface, placing the outer shell inside out on the base member, such the outer surface of the outer shell is adjacent to the outer surface of the base member, and during the coating step, the base member and outer shell are dipped into the liquid waterproof coating therein. The method also can include adding an aggregate to the liquid coating prior to the dipping step and/or providing a coating having a gritty texture to an outer surface of the inner liner.

In accordance with another aspect of the present invention there is provided a method of manufacturing a glove assembly that includes the steps of (a) obtaining a base member having an outer surface, (b) obtaining an outer shell having an outer surface and an inner surface, (c) placing the outer shell inside out on the base member, such the outer surface of the outer shell is adjacent to the outer surface of the base member, (d) masking a masked portion of the inner surface of the outer shell with a mask, (e) dipping the outer shell and base member into a vessel with a liquid waterproof coating there to coat the inner surface of the outer shell with the waterproof coating, such that an inner surface of the masked portion is not coated, (f) removing the mask, (g) obtaining an inner liner, and (h) securing the inner liner to the inner surface of the outer shell.

In accordance with another aspect of the present invention there is provided a glove assembly that includes an outer shell comprising a material that is waterproof and breathable and that has an inner surface and an outer surface, a coating layer made of a waterproof material and that includes at least one cut out section defined therein adhered to the inner surface of the outer shell, and an inner liner having an inner surface and an outer surface secured in the outer shell. In a preferred embodiment, the glove assembly is produced by turning the outer shell inside out, masking a masked portion of the inner surface of the outer shell with a mask, coating the inner surface of the outer shell with a waterproof coating and allowing it to dry to produce the coating layer (an inner surface of the masked portion is not coated, thereby defining the cut out section), removing the mask, and securing the inner liner to the inner surface of the outer shell.

During cycling activity, it is desirable to use a glove that is wind proof, waterproof and has a high moisture vapor transfer rate (i.e., it is breathable). In a preferred embodiment, the inventive glove preferably provides a firm handgrip feel such that the inner glove and outer glove are not slippery against a middle liner. Furthermore, the glove keeps any external moisture on the outside surface of the glove. There are many options for providing each of the characteristics discussed above. For example, to make the glove wind proof, waterproof and/or breathable the glove may include OutDry™ technology that has a heat shrink membrane bonded to the inner surface of the glove shell, an internal glove insert, such as a liner made by Goretex or other similar material, and membrane fabrics and a taped construction.

The glove has two or more and preferably three principal component parts; the outer shell, insulation and the inner liner. The insulation can be omitted in another embodiment. The gloves can also include an inner waterproof component, such as a waterproof liner (e.g., bag) that is inserted between the outer shell and the insulation. Outdry shrinks and bonds the waterproof liner to the inside surface of the outer shell. Gloves can also be made using coated fabrics and heat applied to melt bonding tape to the seams of a glove making the glove waterproof.

In a preferred embodiment, the glove includes an inner liner, outer shell and waterproof member. The glove can also include insulation therein. In a preferred embodiment, the inventive glove includes at least some windproof and waterproof membrane fabric that has a high moisture vapor transfer rate. During manufacture of the glove a portion of the coated surface of the windproof and waterproof membrane fabric is masked off. For example, an adhesive tape can be used as a masking agent. In a preferred embodiment, the back of the hand portion is masked off. It will be appreciated that any portion of the glove can be masked off. For example, in another embodiment, at least the palm portion of the glove is masked off.

The glove can them be placed on some type of hand shaped component, form or mandrel (e.g., flexible, rigid, inflatable). The cuff of the glove can then be sealed on the mandrel. The inner surface of the outer shell is then coated by spraying or dipping or another coating method using a liquid coating such as PU, latex or nitrile. The coating is then cured using heat or another curing technique. In one preferred embodiment, the coating has a gritty texture that includes sand, aggregate or some other media to create a mechanical texture or traction surface that reduces the movement between the inner glove or insulation and outer shell. Preferably, the textured coating is on the outer shell. However, this is not a limitation and the gritty texture can be omitted.

The masking is then removed to expose the breathable surface and the glove is removed from the mandrel. The remainder of the glove is then constructed. The result is a glove that is waterproof and breathable everywhere, including the masked portion.

Examples of the present invention are set forth below. The full dip version includes a glove or mitten that includes one or more fingers and has at least two components, the first component being an outer shell that comprises a waterproof and breathable fabric (this can be a fabric with coatings laminates, applied membranes), the second component being an inner glove lining. To create the glove, the outer shell is turned inside out so the inside is exposed and the inner surface of the outer shell is coated with a waterproof, windproof. The inner glove lining is then attached to the outer shell.

The masked and dipped version (similar to the full dip version above) includes, prior to the coating step, one or more areas of the inner shell are masked to prevent the coating from adhering to or covering those areas.

In the high grip version (also similar to the full dip version above), the coating includes some type of texture that provides a high grip between the inner lining and outer shell.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
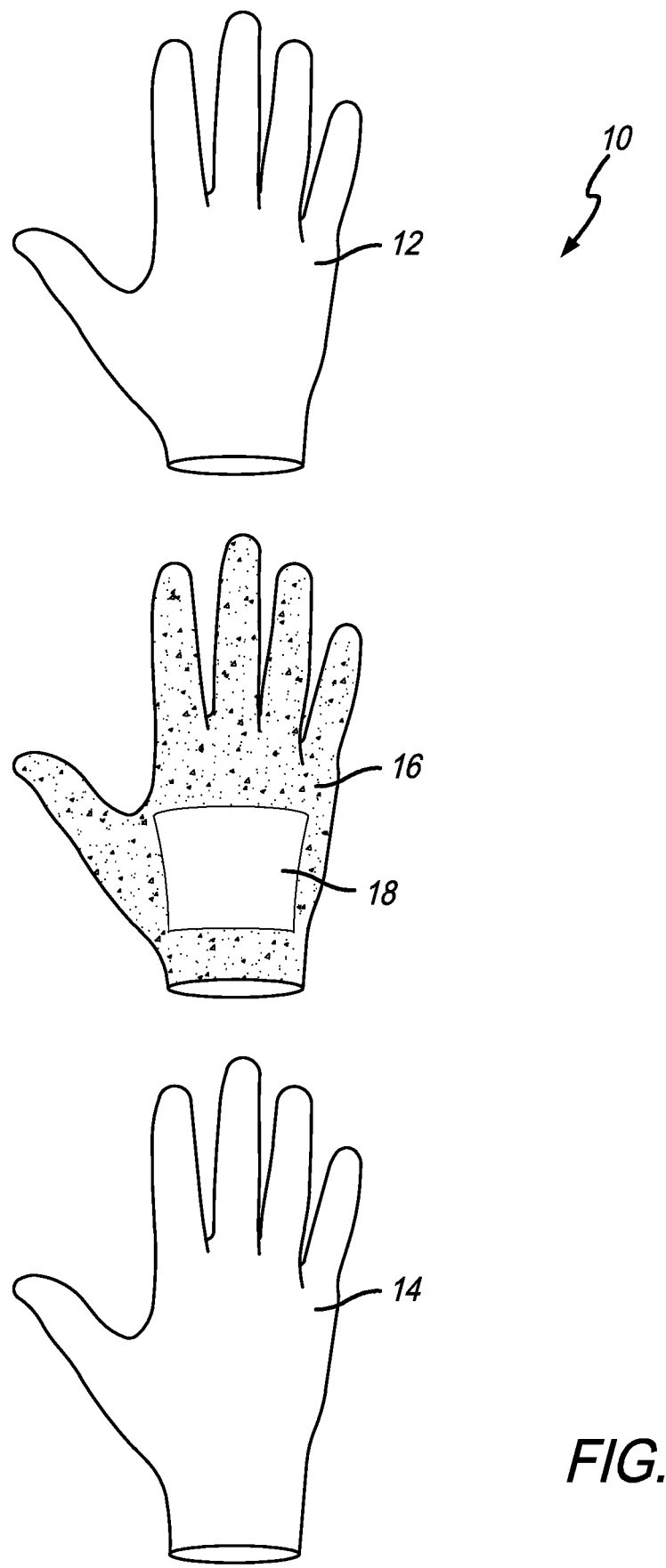
FIG. 1 is an exploded perspective view of a glove assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "upper," "lower," "side," "short," "long," "up," "down," and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-5 show a glove assembly 10 and a method for making the glove assembly in accordance with a preferred embodiment of the present invention. As shown in FIG. 1, the glove assembly 10 generally includes an outer shell 12 and an inner liner 14 and a waterproof coating layer 16. It will be appreciated that the glove assembly 10 can include finger portions (i.e., a traditional glove) or can omit the finger portions (i.e., a mitten).

The outer shell 12 preferably comprises a waterproof, breathable (i.e., the material has a high moisture vapor transfer rate) and windproof material. For example, the outer shell 12 can be made of Gore-Tex®, which comprises stretched polytetrafluoroethylene (PTFE). However, any waterproof and breathable fabric is within the scope of the present invention.

The coating layer 16 preferably comprises a waterproof material, such as polyurethane (PU), latex, nitrile or rubber, that is not necessarily breathable (i.e., the material does not have a high moisture vapor transfer rate). However, it may have some degree of breathability. It will be appreciated that the area without the coating (just the outer shell) provides a higher degree or amount of breathability than the area where there is a coating on the outer shell. Furthermore, the coating layer 16 provides a higher degree of waterproofing than the outer shell 14 alone. Any waterproof material is within the scope of the present invention. Any waterproof and breathable material is within the scope of the present invention. It will be appreciated that waterproof and breathable are terms of art used in the cycling and outdoor clothing fields and a person of ordinary skill in the art will understand their meanings.

The inner liner 14 preferably comprises a material that is comfortable against the wearer's hand. Any material that is typically used for the inner liners of gloves is within the scope of the present invention. For example, the inner liner 14 can be polypropylene, polyester, merino wool, silk or the like. Preferably, the inner liner 14 is also breathable, and is not necessarily waterproof.

In a preferred embodiment, the coating layer 16 includes one or more breathable cut outs or sections 18 therein, as shown in FIG. 1. With this construction, the majority of the glove assembly 10 includes the outer shell waterproof layer and the coating waterproof layer. However, this configuration can tend to retain body heat and sweat and become hot and clammy. Therefore, by providing the breathable section 18, the glove assembly 10 includes certain areas of thickness where there is only the breathable outer shell 12 and the breathable inner liner 14, thereby providing the ability for body sweat and heat to be wicked away in that area. For example, FIG. 1 shows the cut section 18 on the back of the hand, which is hit by the wind when cycling. This can provide breathability while riding. Other cut outs can be provided in the fingers, palm or any other area of the hand.

Figure 2:
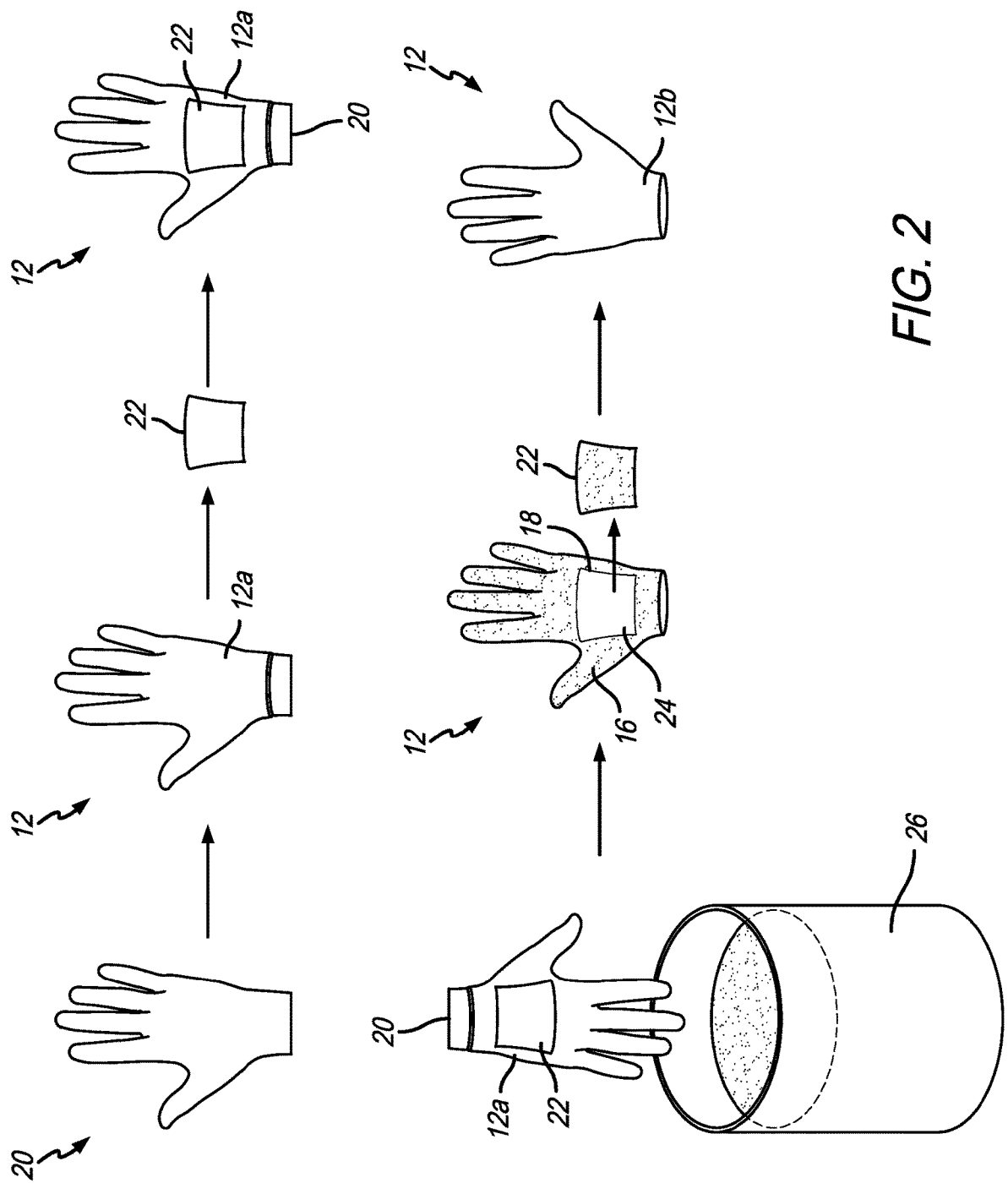
FIG. 2 shows a series of steps in constructing the glove assembly of FIG. 1.

FIG. 2 shows a number of steps in a method for coating the inner surface 12a of the outer shell 12 to provide the coating layer 16. In a preferred embodiment, a mandrel or base member 20 that is shaped like a hand, glove or mitten is provided. The base member 20 can be any hand shaped component, form or mandrel and can be flexible, rigid, inflatable, etc. Next, the method includes obtaining or providing the outer shell 12 and turning it inside out to expose the inner surface 12a and placing the outer shell 12 inside out on the base member 20. The cuff of the outer shell 12 can be sealed (e.g., taped, clamped) on the base member 20 to prevent any liquid coating from getting on the outer surface 12b (which is inside at this point of the process) of the outer shell 12. Next, a mask 22 (which can be a tape or the like) is placed onto a masked portion 24 of the inner surface 12a of the outer shell. It will be appreciated that the masked portion 24 is the area of the inner surface 12a of the outer shell 12 that is desired to remain breathable. The mask 22 can be any material or method that prevents the liquid coating (discussed below) from adhering to the inner surface 12a of the outer shell 12. For example, the masking agent can employ a magnet, adhesive tape, a removable adhesive or glue, etc.

The waterproof coating is then applied to the inner surface 12a of the outer shell 12. The waterproof coating can be applied by spraying, dipping or any other method. In a preferred embodiment, a dipping method is used, as shown in FIG. 2. In this embodiment, a vessel 26 (any type of container is within the scope of the present invention) that includes the waterproof coating in liquid form therein is provided. The outer shell 12 and base member 20 are dipped into the liquid coating in the vessel 26 to coat the entire exposed inner surface 12a of the outer shell 12. The coating is then cured using heat or another curing technique and allowed to dry. The mask 22 is then removed to expose the masked portion 24 (breathable portion) of the inner surface 12a of the outer shell 12 and the outer shell 12 is removed from the base member 20. It will be appreciated that the coating 16 covers and coats any stitched portions of the outer shell 12 to provide waterproofing of the stitches and any openings or holes related thereto.

Figure 3:
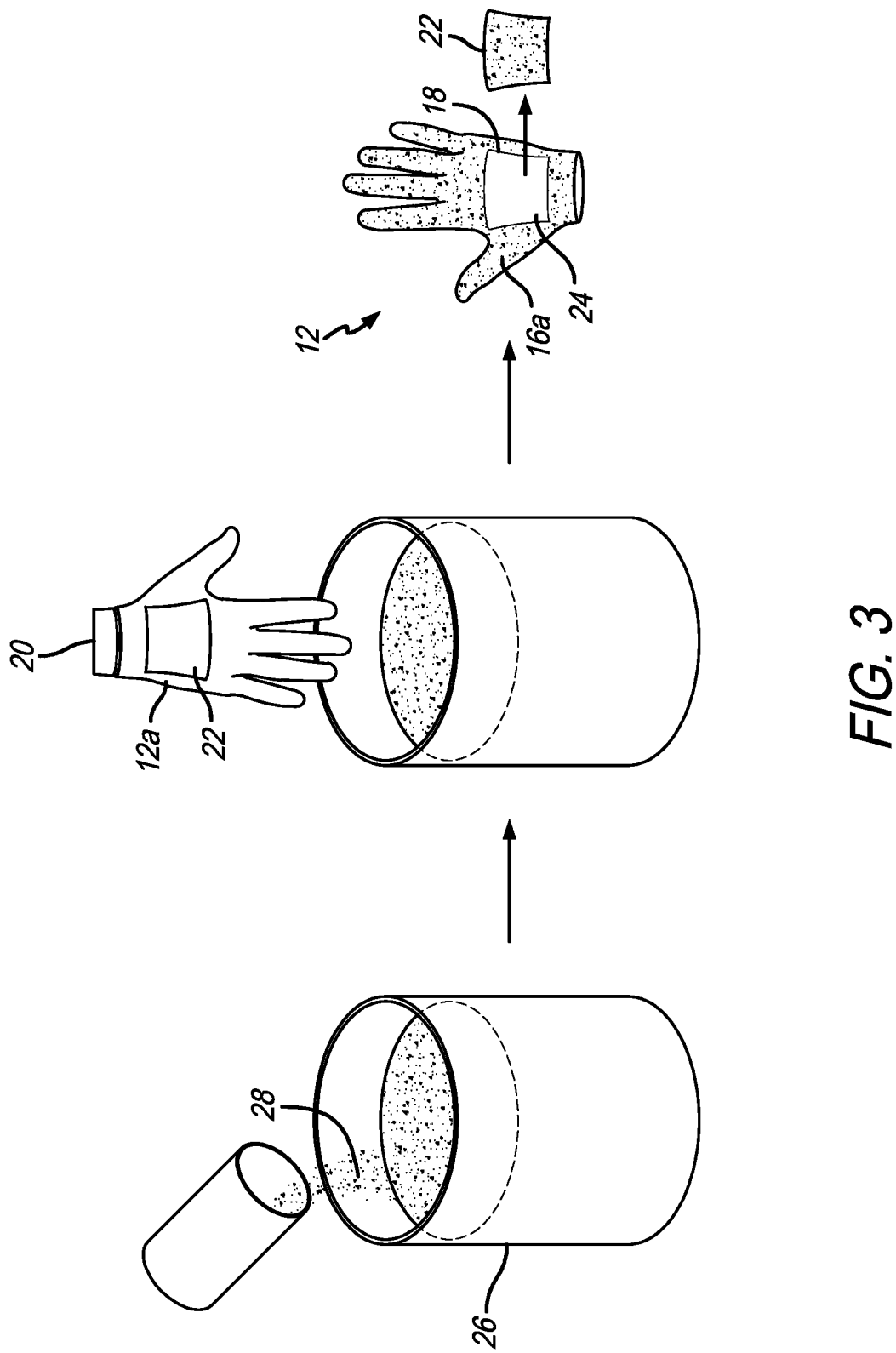
FIG. 3 shows a series of steps in constructing a glove assembly with a gritty textured layer between the outer shell and inner liner.

FIG. 3 shows an alternative embodiment where an aggregate 28 is added to the liquid coating so that the final dried coating (coating layer 16) has a gritty or rough texture. The aggregate can be any aggregate material, such as sand, grit, or other media that provides a mechanical texture or traction surface on the final dried coating layer 16 to provide friction and that reduce the movement between the inner liner or insulation and outer shell 12. See the textured coating layer 16a on the inner surface 12a of the outer shell 12 in FIG. 3.

Figure 4:
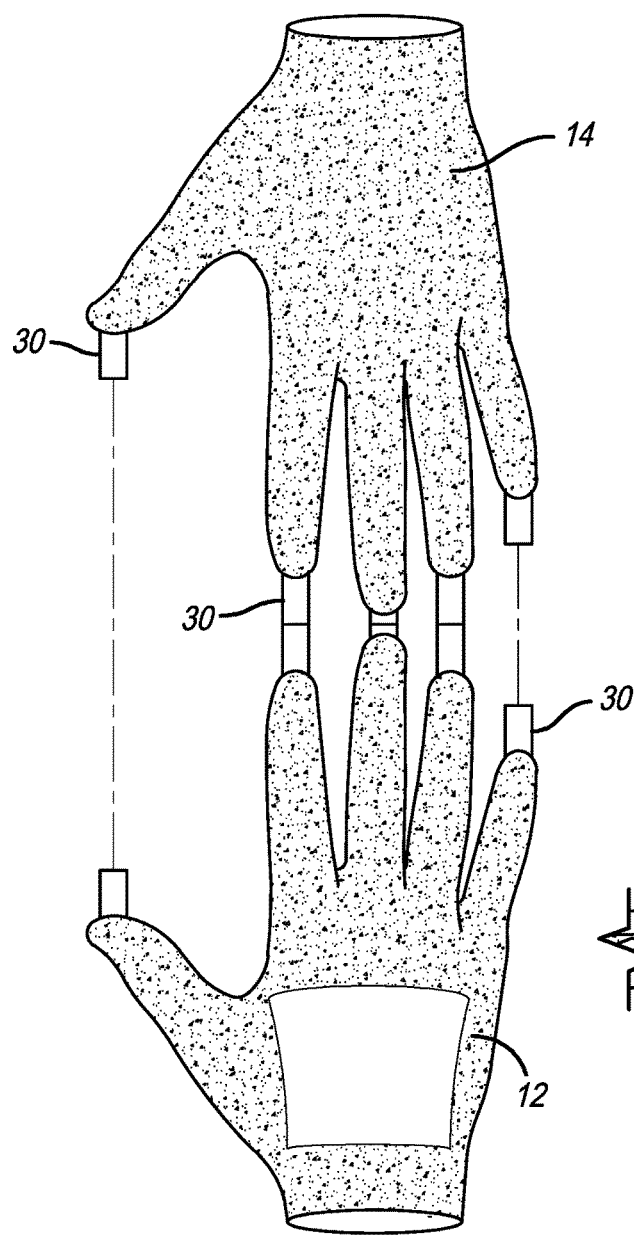
FIG. 4 shows another step in the construction of the glove assembly.

After the coating layer 16 or 16a is added to the outer shell 12, the inner liner 14 is then attached to the outer shell 12 and the glove assembly 10 is oriented such that the outer shell is on the outside. The inner liner can be attached, secured or stitched to the outer shell by any known method. As shown in FIG. 4, the inner surface 12a of the outer shell 12 and the outer surface 14b of the inner liner 14 can include connection tabs 30 thereon that are stitched or otherwise attached together to secure the inner liner 14 to the outer shell 12. The inner liner can be attached to the outer shell either on or off the base member. An intervening insulation layer can also be provided between the inner liner 14 and outer shell 12. Appropriate tabs can be provided for securing the plurality of layers to one another as needed.

Figure 5:
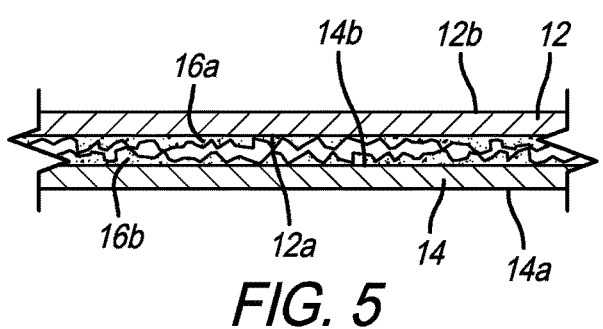
FIG. 5 is a cross-section of the glove assembly showing a gritty textured layer on both the outer shell and the inner liner.

As shown in FIG. 5, in a preferred embodiment, the outer surface 14b of the inner liner 14 can also include a textured coating layer 16a thereon that contacts the textured coating layer 16a on the outer shell 12. This can be provide further friction and reduction of movement between the outer shell and the inner liner. In an embodiment that includes an insulation layer between the outer shell and inner liner, the textured coating layer can be provided on the outer surface of the insulation.

In another embodiment, the masking step can be omitted and the entire inner surface 12a of the outer shell 12 can be coated. In another embodiment, the base member can be omitted.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further any specific numbers noted herein are only examples: alternative implementations may employ differing values or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A glove assembly comprising:
   an outer shell having an inner surface and an outer surface, wherein the outer shell comprises a material that is waterproof and breathable,
   an inner liner having an inner surface and an outer surface, wherein the inner layer is secured in the outer shell, and
   a coating layer adhered to the inner surface of the outer shell and disposed between the outer shell and the inner liner, wherein the coating layer includes a cut out section defined therein, wherein the coating layer is made of a waterproof material, and the coating layer includes aggregate therein, such that the coating layer has a gritty texture.

2. The glove assembly of claim 1 produced by the steps of:
   (a) turning the outer shell inside out,
   (b) masking a masked portion of the inner surface of the outer shell with a mask,
   (c) coating the inner surface of the outer shell with a waterproof coating and allowing it to dry to produce the coating layer, wherein an inner surface of the masked portion is not coated, thereby defining the cut out section,
   (d) removing the mask, and
   (e) securing the inner liner to the inner surface of the outer shell.

3. The glove assembly of claim 2 wherein during step (c) the outer shell is dipped into a vessel with a liquid waterproof coating therein.

4. The glove assembly of claim 1 produced by the steps of:
   (a) turning the outer shell inside out,
   (b) masking a masked portion of the inner surface of the outer shell with a mask,
   (c) coating the inner surface of the outer shell with a waterproof coating that includes an aggregate therein and allowing it to dry to produce the coating layer with a gritty texture, wherein an inner surface of the masked portion is not coated, thereby defining the cut out section,
   (d) removing the mask, and
   (e) securing the inner liner to the inner surface of the outer shell.

* * * * *